(12) United States Patent
Dodo

(10) Patent No.: US 11,173,916 B2
(45) Date of Patent: Nov. 16, 2021

(54) VEHICLE CONTROL APPARATUS

(71) Applicant: TOYOTA JIDOSHA KABUSHIKI KAISHA, Toyota (JP)

(72) Inventor: Kohei Dodo, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 194 days.

(21) Appl. No.: 15/869,904

(22) Filed: Jan. 12, 2018

(65) Prior Publication Data

US 2018/0201266 A1 Jul. 19, 2018

(30) Foreign Application Priority Data

Jan. 18, 2017 (JP) .............................. JP2017-007112

(51) Int. Cl.
*B60K 23/00* (2006.01)
*B60W 30/14* (2006.01)
(Continued)

(52) U.S. Cl.
CPC .......... *B60W 30/188* (2013.01); *B60W 10/06* (2013.01); *B60W 30/182* (2013.01); *B60W 30/18018* (2013.01); *B60W 30/18072* (2013.01); *G08G 1/0112* (2013.01); *G08G 1/096725* (2013.01); *B60W 2030/1809* (2013.01); *B60W 2050/0073* (2013.01); *B60W 2510/0604* (2013.01); *B60W 2510/0609* (2013.01); *B60W 2520/10* (2013.01); *B60W 2540/215* (2020.02); *B60W 2552/05* (2020.02);
(Continued)

(58) Field of Classification Search
CPC ............. G08G 1/096725; Y02T 10/48; B60W 2750/40; B60W 2550/408
See application file for complete search history.

(56) References Cited

U.S. PATENT DOCUMENTS 6,371,889 B1 * 4/2002 Kuroda .................. B60K 6/485
477/167
6,463,900 B1 * 10/2002 Wakabayashi ...... F02N 11/0837
123/179.4
(Continued)

FOREIGN PATENT DOCUMENTS

CN 105976629 A 9/2016
CN 106094809 A 11/2016
(Continued)

*Primary Examiner* — Adam D Tissot
*Assistant Examiner* — Laura E Linhardt
(74) *Attorney, Agent, or Firm* — Oliff PLC

(57) ABSTRACT

A control apparatus for a vehicle, which is provided with an engine and drive wheels, is configured, during an inertia running or stop of the vehicle, to execute a control for stopping the engine and/or disconnecting the engine from the drive wheels in each area, depending on whether a condition is satisfied or not. The condition is set based on an information transferred from other vehicle in which the control is executable during an inertia running or stop of the other vehicle. The information includes (a) a location information indicative of the each area and (b) an acceleration representative value representing a required acceleration of the other vehicle required by an operator of the other vehicle in the each area. The acceleration representative value is associated with the location information indicative of the each area.

9 Claims, 7 Drawing Sheets

(51) Int. Cl.
  *B60W 30/18*     (2012.01)
  *B60W 40/04*     (2006.01)
  *B60W 30/188*    (2012.01)
  *B60W 10/06*     (2006.01)
  *B60W 30/182*    (2020.01)
  *G08G 1/01*      (2006.01)
  *G08G 1/0967*    (2006.01)
  *B60W 50/00*     (2006.01)

(52) U.S. Cl.
  CPC ..... *B60W 2552/15* (2020.02); *B60W 2556/50* (2020.02); *B60W 2556/65* (2020.02); *B60W 2710/0644* (2013.01); *B60W 2720/106* (2013.01); *B60W 2756/10* (2020.02); *Y02T 10/40* (2013.01); *Y02T 10/60* (2013.01); *Y02T 10/84* (2013.01)

(56) References Cited

U.S. PATENT DOCUMENTS

| | | | | |
|---|---|---|---|---|
| 6,504,259 | B1* | 1/2003 | Kuroda | B60K 6/46 |
| | | | | 290/400 |
| 6,532,926 | B1* | 3/2003 | Kuroda | B60H 1/00778 |
| | | | | 123/179.4 |
| 9,701,310 | B2* | 7/2017 | Kato | B60W 30/16 |
| 9,725,093 | B2* | 8/2017 | Chunodkar | B60W 30/18 |
| 10,118,616 | B2* | 11/2018 | Nemoto | G08G 1/22 |
| 2007/0276570 | A1* | 11/2007 | AbuSamra | B60W 30/1882 |
| | | | | 701/54 |
| 2011/0022255 | A1* | 1/2011 | Yamada | B60K 6/46 |
| | | | | 701/22 |
| 2012/0010792 | A1* | 1/2012 | Nedorezov | B60W 10/06 |
| | | | | 701/54 |
| 2013/0245923 | A1* | 9/2013 | Matsuda | B60W 10/06 |
| | | | | 701/110 |
| 2014/0297161 | A1* | 10/2014 | Stanek | F02D 41/30 |
| | | | | 701/104 |
| 2014/0309912 | A1* | 10/2014 | Hirano | F02D 17/00 |
| | | | | 701/112 |
| 2015/0307102 | A1* | 10/2015 | Mitsuyasu | B60W 10/10 |
| | | | | 701/48 |
| 2016/0069317 | A1* | 3/2016 | Koibuchi | F02N 11/0833 |
| | | | | 701/112 |
| 2016/0290264 | A1* | 10/2016 | Oda | F02D 41/042 |
| 2016/0305388 | A1* | 10/2016 | Miller | F02N 11/0818 |
| 2016/0318523 | A1 | 11/2016 | Kim et al. | |
| 2017/0080923 | A1* | 3/2017 | Johri | B60K 6/442 |
| 2017/0127246 | A1* | 5/2017 | Zou | H04W 4/029 |
| 2017/0291606 | A1* | 10/2017 | Yamada | F02D 29/02 |
| 2017/0321767 | A1* | 11/2017 | Khafagy | F16D 48/06 |
| 2017/0369059 | A1 | 12/2017 | Schuberth et al. | |

FOREIGN PATENT DOCUMENTS

| | | |
|---|---|---|
| EP | 2 781 722 A1 | 9/2014 |
| JP | 2006-240368 A | 9/2006 |
| JP | 2008-001258 A | 1/2008 |
| JP | 2013-154668 A | 8/2013 |
| JP | 2013-199163 A | 10/2013 |
| JP | 2015-102047 A | 6/2015 |
| WO | 2016/007072 A1 | 1/2016 |
| WO | 2016/116276 A1 | 7/2016 |
| WO | 2018/054914 A1 | 3/2018 |

\* cited by examiner

FIG.2

| FUEL-EFFICIENCY INCREASE CONTROL | RUNNING STATE | ENGINE 14 | CLUTCH C1 |
|---|---|---|---|
| NORMAL CONTROL (WITHOUT FUEL-EFFICIENCY INCREASE CONTROL) | STOPPED OR RUNNING | OPERATED | ENGAGED |
| IDLE STOP CONTROL | STOPPED | STOPPED WITH F/C | RELEASED (PARTIALLY-RELEASED) |
| DECELERATION ECONOMY RUNNING CONTROL | INERTIA RUNNING AT LOW SPEED | STOPPED WITH F/C | RELEASED (PARTIALLY-RELEASED) |
| FREE-RUN CONTROL | INERTIA RUNNING AT MIDDLE OR HIGH SPEED | STOPPED WITH F/C | RELEASED (PARTIALLY-RELEASED) |
| NEUTRAL CONTROL | STOPPED | IDLING | RELEASED (PARTIALLY-RELEASED) |
| NEUTRAL INERTIA RUNNING CONTROL | INERTIA RUNNING | IDLING | RELEASED (PARTIALLY-RELEASED) |

VEHICLE CONTROL APPARATUS

This application claims priority from Japanese Patent Application No. 2017-007112 filed on Jan. 18, 2017, the disclosure of which is herein incorporated by reference in its entirety.

FIELD OF THE INVENTION

The present invention relates to a control apparatus for a vehicle provided with an engine and drive wheels to which a drive force of the engine is to be transmitted.

BACKGROUND OF THE INVENTION

There is well known a control apparatus for a vehicle provided with an engine and drive wheels to which a drive force of the engine is to be transmitted, wherein the engine can be stopped and/or the engine can be disconnected from the drive wheels during an inertia running or stop of the vehicle, for improving fuel efficiency. A control apparatus for a hybrid vehicle disclosed in JP-2008-1258A is an example of this type of control apparatus. This document discloses that the fuel efficiency is improved by disconnecting the engine from the drive wheels and also stopping the engine when given conditions are satisfied. This document also discloses that, when a manual shifting mode is selected, acceleration responsiveness is improved by inhibiting disconnection of the engine from the drive wheels and also inhibiting stop of the engine.

SUMMARY OF THE INVENTION

By the way, there is a case where a value representing an acceleration actually required by an operator of the vehicle is low even when an acceleration intention of the vehicle operator is high, for example, with the manual shifting mode being selected. In such a case, if the engine stop and the engine disconnection from the drive wheels are necessarily inhibited simply because of the high acceleration intention of the vehicle operator, the improvement of the fuel efficiency could be reduced.

The present invention was made in view of the background art described above. It is therefore an object of the present invention to provide a control apparatus for a vehicle, which is capable of restraining reduction in the improvement of the fuel efficiency, which reduction could be caused when an engine of the vehicle is inhibited from being stopped and also the engine is inhibited from being disconnected from driving wheels of the vehicle.

The object indicated above is achieved according to the following modes of the present invention:

According to a first mode of the invention, there is provided a control apparatus for a vehicle provided with an engine and drive wheels to which a drive force of the engine is to be transmitted. The control apparatus is configured, during an inertia running or stop of the vehicle, to execute a control for stopping the engine and/or disconnecting the engine from the drive wheels in area, depending on whether a condition is satisfied or not. The condition is set based on an information that is transferred from other vehicle in which the above-described control is executable during an inertia running or stop of the other vehicle. The transferred information includes (a) a location information indicative of the each area and (b) an acceleration representative value representing a required acceleration of the other vehicle required by an operator of the other vehicle in the each area. The acceleration representative value is associated with the location information indicative of the each area. It is noted that the term "area" may be referred also to as "zone" or "region". It is also noted that the control apparatus may generate an information including (a) a location information indicative of an area and (b) an acceleration representative value representing a required acceleration of the vehicle required by an operator of the vehicle in the area, wherein the acceleration representative value is associated with the location information indicative of the area, and the control apparatus may transfer the generated information to an external device that is located outside the vehicle, via a transceiver provided in the vehicle.

According to a second mode of the invention, in the control apparatus according to the first mode of the invention, the control apparatus determines whether executing the control or not, depending on a difference between the acceleration representative value representing the required acceleration in the other vehicle when the control has been executed in the other vehicle and the acceleration representative value representing the required acceleration in the other vehicle when the control has not been executed in the other vehicle, and the control apparatus does not execute the control in an area indicated by the location information that is associated with the acceleration representative value, in a case where the difference is larger than a threshold value.

According to a third mode of the invention, in the control apparatus according to the second mode of the invention, the control apparatus determines which one of a drive force performance and a fuel efficiency performance of the vehicle is given more importance by an operator of the vehicle, and the control apparatus executes the control in the area indicated by the location information that is associated with the acceleration representative value, irrespective of whether the drive force performance and the fuel efficiency performance is given more importance by the operator, in a case where the difference is not larger than the threshold value.

According to a fourth mode of the invention, in the control apparatus according to the second or third mode of the invention, the threshold value varies depending on an area indicated by the location information that is associated with the acceleration representative value.

According to a fifth mode of the invention, in the control apparatus according to the first mode of the invention, in a case where the acceleration representative value associated with the location information indicative of an area is larger than a threshold value, the control apparatus does not execute the control in the area.

According to a sixth mode of the invention, in the control apparatus according to the fifth mode of the invention, the control apparatus determines which one of a drive force performance and a fuel efficiency performance of the vehicle is given more importance by an operator of the vehicle, and the control apparatus executes the control in the area indicated by the location information that is associated with the acceleration representative value, irrespective of whether the drive force performance and the fuel efficiency performance is given more importance by the operator, in a case where the acceleration representative value is not larger than the threshold value.

According to a seventh mode of the invention, in the control apparatus according to the fifth or sixth mode of the invention, the threshold value varies depending on an area indicated by the location information that is associated with the acceleration representative value.

According to an eighth mode of the invention, in the control apparatus according to any one of the first through seventh modes of the invention, the control apparatus executes the control, in a case where an actual fuel efficiency is reduced by at least a threshold ratio when the control has not been executed.

According to any one of the first through eighth modes of the invention, the above-described control is executed for stopping the engine and/or disconnecting the engine from the drive wheels in each area, depending on whether the condition is satisfied or not, wherein the condition is set based on information which is transferred from other vehicle or vehicles and which includes the acceleration representative value (representing the required acceleration of the other vehicle or vehicles required by the vehicle operator or operators) that is associated with the location information indicative of the same area. Thus, it is possible to stop the engine and/or disconnect the engine from the drive wheels, or neither stop the engine nor disconnect the engine from the drive wheels in each area, in accordance with an actual tendency of the required acceleration in the same area. For example, even in a case where an acceleration intention of the vehicle operator is high, the engine can be stopped and/or the engine can be disconnected from the drive wheels, depending on the actual tendency of the required acceleration in each area. It is therefore possible to restrain reduction in improvement of fuel efficiency, which reduction could be caused in an arrangement in which the above-described control is inhibited always in the case where the acceleration intention of the operator is high.

According to any one of the second through fourth modes of the invention, the above-described control is not executed, namely, the engine is not stopped and the engine is not disconnected from the drive wheels, in the area indicated by the location information, where the difference between the acceleration representative value in case with execution of the above-described control and the acceleration representative value in case without execution of the above-described control is larger than the threshold value. Thus, it is possible to stop the engine and/or disconnect the engine from the drive wheels, or neither stop the engine nor disconnect the engine from the drive wheels in each area, in accordance with the actual tendency of the required acceleration in the same area.

According to the third mode of the invention, even if the drive performance is given more importance, namely, even if the operator's acceleration intention is high, the above-described control can be executed in an area in a case the above-described difference (between the acceleration representative value in case with execution of the above-described control and the acceleration representative value in case without execution of the above-described control) is small in the same area.

According to the fourth mode of the invention, the threshold value, based on which the above-described difference is determined to be large or small, is a given value that varies depending on an area indicated by the location information that is associated with the acceleration representative value. Thus, the determination as to whether the above-described difference is large or small, i.e., the determination as to whether the above-described control should be inhibited or allowed in each area can be made suitably depending on the type of running road (such as flat road, uphill road and downhill road) in the same area.

According to the fifth through seventh modes of the invention, in a case where the acceleration representative value associated with the location information indicative of an area is larger than the threshold value, the above-described control is not executed in the same area, so that it is possible to stop the engine and/or disconnect the engine from the drive wheels, or neither stop the engine nor disconnect the engine from the drive wheels in each area, in accordance with an actual tendency of the required acceleration in the same area.

According to the sixth mode of the invention, it is possible to stop the engine and/or disconnect the engine from the drive wheels in an area in which the acceleration representative value tends to be small, even when the drive force performance is given more importance, namely, even when the operator's acceleration intention is high.

According to the seventh mode of the invention, the threshold value, which is used in the determination as to whether the acceleration representative value representing the acceleration required by the operator is large or small, is a given value that varies depending on an area indicated by the location information that is associated with the acceleration representative value. Thus, a condition or conditions, which are to be satisfied for executing the above-described control, are determined depending on area, for example, depending on type of running road such as flat road, uphill road and downhill road.

According to the eighth mode of the invention, in a case where the actual fuel efficiency is reduced by the threshold ratio or more with the engine is not being stopped and with the engine is not disconnected from the drive wheels, the engine is stopped and/or the engine is disconnected from the drive wheels, for making it possible to minimize reduction of the fuel efficiency.

BRIEF DESCRIPTION OF THE DRAWINGS

FIG. 2 is a view explaining a case where a fuel-efficiency increase control is not executed and cases where the fuel-efficiency increase control is executed in respective manners or modes;

DETAILED DESCRIPTION OF PREFERRED EMBODIMENTS

In embodiments of the present invention, the vehicle is provided with an automatic transmission configured to transmit the drive force of the engine to the drive wheels. The automatic transmission may be, for example, a known planetary gear automatic transmission, a known synchronous meshing type parallel two-shaft automatic transmission, a so-called DCT (Dual Clutch Transmission) which is a synchronous meshing type parallel two-shaft automatic transmission and which is of a type having two systems of input shafts, a so-called belt type continuously variable transmission or a so-called toroidal type continuously variable transmission. Among these transmissions, for example, the planetary gear automatic transmission may include a hydraulic transmission device.

The vehicle may be provided with a connecting/disconnecting device which is disposed in a power transmitting path between the engine and the drive wheels and which is controlled, by the control apparatus, to selectively connect and disconnect the engine to and from the drive wheels, for thereby selectively allowing and inhibiting transmission of the drive force through the power transmitting path. The connecting/disconnecting device may be a frictional coupling device such as a brake or clutch of friction engagement type. Further, the connecting/disconnecting device may have any one of arrangements such as an arrangement in which the transmission of the drive force through the power transmitting path is selectively allowed and inhibited by electrically controlling a reaction force. Moreover, the connecting/disconnecting device may be constituted by an automatic transmission that includes a plurality of clutches and brakes so as to be placed in its neutral state.

The engine may be an internal combustion engine such as a gasoline engine and a diesel engine generating drive force by combustion of fuel supplied thereto. The vehicle may be equipped with, in addition to a drive force source in the form of the engine, another drive force source in the form of, for example, an electric motor.

The embodiments will be described in detail with reference to the drawings.

First Embodiment

Figure 1:
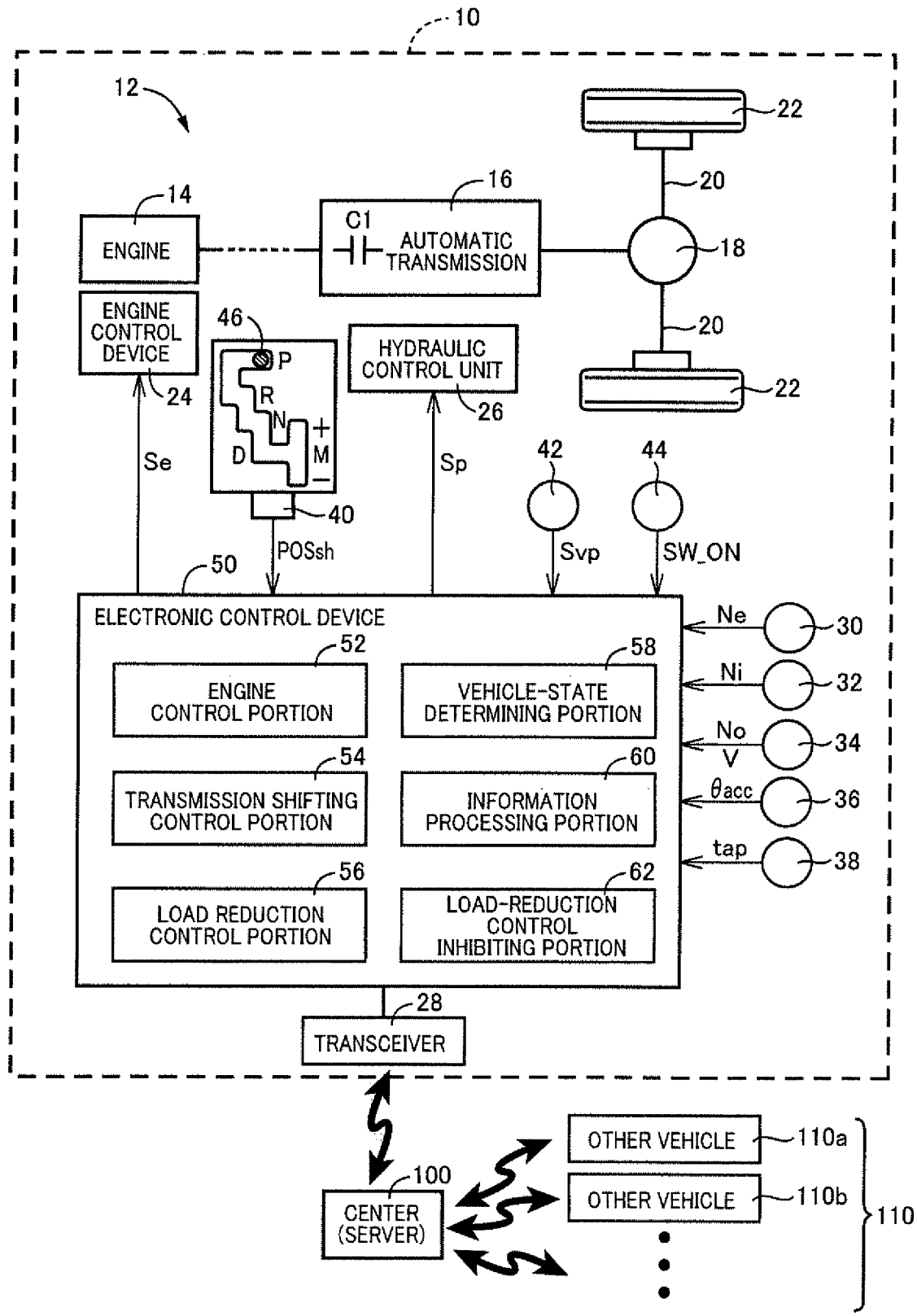
FIG. 1 is a schematic view showing an arrangement of a drive system of a vehicle to be controlled by a control apparatus according to the present invention, and major control functions and control portions of the control apparatus.

Reference is first made to FIG. 1, which is the schematic view showing an arrangement of a drive system 12 of a vehicle 10 to be controlled by a control apparatus according to the present invention, and major portions of the control apparatus to perform various controls of the vehicle 10. As shown in FIG. 1, the drive system 12 is provided with an engine 14 functioning as a drive power source, an automatic transmission 16 connected directly or indirectly via a damper (not shown) or any other device to the engine 14, a differential gear device 18 connected to an output rotary member of the automatic transmission 16 and a pair of axles 20 connected to the differential gear device 18. In the drive system 12, a drive force ("drive torque" or "drive power" unless otherwise distinguished from the drive force) of the engine 14 is transmitted to the automatic transmission 16, and is transmitted from the automatic transmission 16 to drive wheels 22 of the vehicle 10 through the differential gear device 18 and other devices.

The engine 14 is provided with an engine control device 24 including an electronic throttle device, a fuel injection device, an ignition device and other devices that are required for controlling an output of the engine 14. In the engine 14, the engine control device 24 is controlled, by an electronic control device 50 (that will be described below), based on an operation amount θacc of an accelerator pedal that corresponds to a required drive force of the vehicle 10 required by an operator of the vehicle 10, whereby an engine torque Te of the engine 14 is controlled. Thus, a throttle opening degree tap, i.e., a degree of opening of a throttle valve included in the electronic throttle device, is also a value corresponding to the required drive force.

The automatic transmission 16 is a step-variable transmission that constitutes a part of a power transmitting path between the engine 14 and the drive wheels 22. The automatic transmission 16 is a known planetary gear automatic transmission including, for example, a plurality of planetary gear devices and a plurality of hydraulically operated frictional coupling devices (hereinafter referred to as "coupling devices CB") such as clutches and brakes. The coupling devices CB are selectively placed in engaged, slipped or released states, with their torque capacities being changed according to engaging hydraulic pressures applied thereto, which are regulated by respective solenoid-operated valves or the like incorporated within a hydraulic control unit (hydraulic control circuit) 26. In the automatic transmission 16 having a plurality of gear positions (speed positions) having respective different speed ratios (gear ratios) e (=AT input speed Ni/AT output speed No), a selected one of a plurality of gear positions is established by engagement of one or ones of the coupling devices CB. That is, an operation state of each of the coupling devices CB is controlled, depending on, for example, an operation of the accelerator pedal by the vehicle operator and a running speed V of the vehicle, by the electronic control device 50, whereby one of the gear positions is switched to another of the gear positions (namely, the plurality of gear positions are selectively established). Further, in the automatic transmission 16, with all of the coupling devices CB being placed in their released states, a neutral state is established without any one of the gear positions being established, so that the transmission of the drive force through the automatic transmission 16 is cut off. A clutch C1 is one of the coupling devices CB, and functions as an input clutch of the automatic transmission 16. The clutch C1 is disposed in a power transmitting path between the engine 14 and the drive wheels 22, so as to function also as a connecting/disconnecting device configured to selectively connect and disconnect the power transmitting path (namely, selectively allowing and inhibiting transmission of the drive force through the power transmitting path). Thus, the automatic transmission 16 is placed in the neutral state with the clutch C1 being placed in its released state. It is noted that the automatic transmission 16 may be constituted by a belt type or other type continuously variable transmission in place of the step-variable transmission.

The vehicle 10 is provided with a transceiver 28. The transceiver 28 is a device configured to communicate with a site or center 100 that is a facility existing apart from the vehicle 10, so that the electronic control device 50 provided in the vehicle 10 transmits and receives various informations to and from the center 100 via the transceiver 28. The center 100 functions as a server, and is configured to receive, process, store and provide various informations. The center 100 transmits and receives various informations to and from other vehicles 110a, 110b, (hereinafter referred to as "other vehicles 110"), as well as to and from the vehicle 10. Each of the other vehicles 110 has substantially the same construction as the vehicle 10 and basically has substantially the same functions as the vehicle 10. The center 100 and the other vehicles 110 can be considered as external devices that are located outside the vehicle 10. It can be considered that the electronic control device 50 of the vehicle 10 cooperates with the center 100 and electronic control devices (each of which functionally corresponds to the electronic control device 50) of the other vehicles 110 to constitute a vehicle control system in which the various informations are shared with one another.

The vehicle 10 is provided with the electronic control device 50 as a controller including the control apparatus constructed according to the present invention. The electronic control device 50 is configured to control various devices of the vehicle 10 such as the engine 14 and automatic transmission 16. For example, the electronic control device 50 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control device 50 may be constituted by two or more control units exclusively assigned to perform different control operations such as engine control operations and transmission shifting control operations.

The electronic control device 50 receives various input signals based on values detected by respective sensors provided in the vehicle 10. Specifically, the electronic control device 50 receives: an output signal of an engine speed sensor 30 indicative of an engine speed Ne which is a rotation speed of the engine 14; an output signal of an input speed sensor 32 indicative of a transmission input speed Ni which is an input rotation speed of the automatic transmission 16; an output signal of an output speed sensor 34 indicative of a transmission output speed No which is an output rotation speed of the automatic transmission 16 and which corresponds to a running speed V of the vehicle 10; an output signal of an accelerator operation amount sensor 36 indicative of an operation amount eacc which represents a degree of acceleration of the vehicle 10 required by a vehicle operator; an output signal of a throttle opening degree sensor 38 indicative of the throttle opening degree tap; an output signal of a shift position sensor 40 indicative of an operation position POSsh of a manually operated shifting member in the form of a shift lever 46 provided in the vehicle 10; an output signal of a location sensor 42 including a GPS antenna and indicative of information Svp (hereinafter referred to as "location information Svp") relating to a position or location of the vehicle 10 on earth's surface or map, which is represented by a GPS signal or the like; and an output signal of a drive-mode selector switch 44 indicative of a mode-on SW_ON which represents operation of the drive-mode selector switch 44. Further, the electronic control device 50 generates various output signals which are supplied to various devices such as the engine control device 24 and the hydraulic control unit 26 and which include an engine control command signal Se for controlling the engine 14; and hydraulic control command signals Sp for controlling the operation states of the coupling devices CB. The hydraulic control command signals Sp are command signals (drive currents) to be supplied to the hydraulic control circuit 26 for driving solenoid-operated valves or the like that regulate engaging hydraulic pressures PRcb to be applied to hydraulic actuators of the coupling devices CB. The electronic control device 50 sets hydraulic pressure command values (command pressures) corresponding to the engaging hydraulic pressures PRcb to be applied to the hydraulic actuators, and outputs drive currents corresponding to the hydraulic pressure command values.

The shift lever 46 is operable to be placed in a selected one of a plurality of operation positions POSsh that consist of, for example, a parking position P, a reverse position R, a neutral position N, a drive position D and manual position M. With the shift lever 46 being placed in the parking position P, the automatic transmission 16 is placed in its parking position in which the automatic transmission 16 is placed in its neutral state and rotation of an output shaft of the automatic transmission 16 is mechanically inhibited (locked). With the shift lever 46 being placed in the reverse position R, the automatic transmission 16 is placed in its reverse drive position for enabling the vehicle 10 to run in a reverse direction. With the shift lever 46 being placed in the neutral position N, the automatic transmission 16 is placed in its neutral position in which the automatic transmission 16 is placed in its neutral state. With the shift lever 46 being placed in the drive position D, the automatic transmission 16 is placed in its forward drive position for establishing an automatic shifting mode in which the automatic transmission 16 is automatically shifted to one of all forward gear positions to enable the vehicle 10 to run in a forward direction. With the shift lever 46 being placed in the manual position M, the automatic transmission 16 is placed in its manual shift position for establishing a manual shifting mode in which the automatic transmission 16 can be switched from one of the gear positions to another by operation of the vehicle operator. The manual position M is provided with a shift-up position (+) and a shift-down position (−), so that the transmission 16 is shifted up each time the shift lever 46 is shifted to the shift-up position (+), while being shifted down each time the shift lever 46 is shifted to the shift-down position (−). While the automatic shifting mode is established with the shift lever 46 being placed in the drive position D as one of the operation positions POSsh, the automatic transmission 16 is automatically shifted to one of the forward gear positions, which is selected in accordance with a known shifting map. While the manual shifting mode is established with the shift lever 46 being placed in the manual position M as one of the operation positions POSsh, the automatic transmission 16 is shifted to one of the forward gear positions, which is selected in accordance with manual operation of the shift lever 46 made by the vehicle operator.

The drive-mode selector switch 44 is an operating member that is to be operated by the vehicle operator, for selecting a desired one of drive modes with which the vehicle is to run. The drive modes consist of, for example, a normal mode, a sport mode (or power mode) and an economy mode. The normal mode is for enabling the vehicle 10 to run in a state that is satisfactory in both of the drive force performance and the fuel efficiency performance. The sport mode is for enabling the vehicle 10 to run in a state in which more importance is given to the drive force performance than to the fuel efficiency performance, as compared with the state of the normal mode. The economy mode is for enabling the vehicle 10 to run in a state in which more importance is given to the fuel efficiency performance than to the drive force performance, as compared with the state of the normal mode.

The electronic control device 50 includes an engine control means or portion in the form of an engine control portion 52, a transmission shifting control means or portion in the form of a transmission shifting control portion 54, and a load reduction control means or portion in the form of a load reduction control portion 56, for performing various controls in the vehicle 10.

The engine control portion 52 controls the engine control device 24, so as to obtain a required engine torque Te. The engine control portion 52 calculates a required drive torque Tdem as a required drive force, for example, by applying the accelerator operation amount θacc and the running velocity V to a predetermined or stored relationship (e.g., drive force map) that is obtained by experimentation or determined by an appropriate design theory. The engine control portion 52 takes account of the gear position of the automatic transmission 16, and outputs the engine control command signal Se for controlling the engine 14 such that the engine torque Te providing the required drive torque Tdem is obtained. As the above-described required drive force, a required drive force Fdem [N] acting on the drive wheels 22, a required drive power Pdem [W] acting on the drive wheels 22, a required output torque Todem outputted from the automatic transmission 16, a required input torque Tidem inputted to the automatic transmission 16, or a required engine torque Tedem outputted from the engine 14 may be used in place of the required drive torque Tdem [Nm] acting on the drive wheels 22. Further, simply, the accelerator operation amount θacc [%], the throttle opening degree tap [Vo] or an amount [g/sec] of air intake by the engine 14 may be used as the above-described required drive force.

The transmission shifting control portion 54 executes a shifting control of the automatic transmission 16. When the shift lever 46 is placed in the drive position D as one of the operation positions POSsh, the transmission shifting control portion 54 establishes the automatic shifting mode. During the automatic shifting mode, the transmission shifting control portion 54 determines whether a shifting action is to be executed in the automatic transmission 16, using the predetermined relationship (e.g., shifting map), and outputs the hydraulic control command signals Sp that is supplied to the hydraulic control circuit 26, for controlling the operation states of the coupling devices CB, so as to automatically switch one of the gear positions of the automatic transmission 16 to another of the gear positions as needed. When the shift lever 46 is placed in the manual position M as one of the operation positions POSsh, the transmission shifting control portion 54 establishes the manual shifting mode. During the manual shifting mode, the transmission shifting control portion 54 that is supplied to the hydraulic control circuit 26, for controlling the operation states of the coupling devices CB, so as to switch one of the gear positions of the automatic transmission 16 to another of the gear positions in accordance with operation of the shift lever 46 made by the vehicle operator, without depending on the above-described shifting map. The shifting map represents a relationship, for example, between the transmission output speed No (that corresponds to the running speed V) and the accelerator operation amount θacc (that corresponds to the required drive torque Tdem and the throttle opening degree tap) that are indicated as parameters in two-dimensional coordinates, with shifting boundary lines (shift-up boundary lines and shift-down boundary lines) based on which the determination as to the shifting action is to be executed in the automatic transmission 16 is to be made.

During a stop of the vehicle 10 or an inertia running of the vehicle 10 (i.e., deceleration of the vehicle 10 with the accelerator pedal being in a released position, namely, with the operation amount θacc of the accelerator pedal being zero or substantially zero), the load reduction control portion 56 is configured, when predetermined control-execution allowing conditions are satisfied, to execute a fuel-efficiency increase control for stopping the engine 14 and/or disconnecting the engine 14 from the drive wheels 22. The load reduction control portion 56 disconnects the engine 14 from the drive wheels 22, by placing the clutch C1 into its released state and thereby cutting off transmission of the drive force through the power transmitting path between the engine 14 and the drive wheels 22. The load reduction control portion 56 stops the engine 14, by supplying the engine control portion 52 with a command requesting, for example, a fuel cut (F/C) suspending a fuel supply to the engine 14. It is noted that the stop of the engine 14 is to be interpreted to mean a stop of activation or operation of the engine 14, and is not necessarily coincident with a stop of rotation of the engine 14. The rotation stop of the engine 14 is dependent on, for example, not only whether the fuel cut is being made but also whether the engine 14 is disconnected from the drive wheels 22. The load reduction control portion 56 disconnects the engine 14 from the drive wheels 22, by supplying the transmission shifting control portion 54 with a command requesting the clutch C1 to be released. The control-execution allowing conditions are predetermined conditions that are to be satisfied to execute the above-described fuel-efficiency increase control, and relate to, for example, a length of time through which the accelerator pedal is held in the released position, the running speed V, a wheel brake operating force, an operation angle of a steering wheel, a distance between vehicles and a need to warm up the engine 14.

When the engine 14 is not stopped in the fuel-efficiency increase control, the engine 14 is placed, for example, in its idling state. Further, the releasing of the clutch C1 may be a full release that is made by controlling the engaging hydraulic pressure of the clutch C1 to substantially zero. However, for enabling the vehicle 10 to be started or accelerated with a better responsiveness after completion of the fuel-efficiency increase control, it is preferable to place the clutch C1 in its partially-released state (engagement standby state), by supplying the clutch C1 with a certain engaging hydraulic pressure that does not cause a torque capacity to be generated in the clutch C1. However, where the fuel-efficiency increase control is executed with stop of rotation of the engine 14, it would not be possible to generate a hydraulic pressure to be supplied to the hydraulic control circuit 26, by a mechanical oil pump that is to driven by the engine 14. Therefore, in a vehicle in which the fuel-efficiency increase control is executed by concurrently stopping the engine 14 and releasing the clutch C1, there is provided, in addition to or in place of the mechanical oil pump, an electrically-operated oil pump that is capable of generating the hydraulic pressure to be supplied to the hydraulic control unit 26 even without rotation of the engine 14.

The fuel-efficiency increase control can be executed in various kinds of manners or forms such as an idle stop control, a deceleration economy running control, a free-run control, a neutral control and a neutral inertia running control, for example. FIG. 2 is a view explaining a case where the fuel-efficiency increase control is not executed in any one of the forms and also cases where the fuel-efficiency increase control is executed in the respective forms. As shown in FIG. 2, in a normal control without execution of the fuel-efficiency increase control, the engine 14 is activated or operated with the clutch C1 being engaged during stop or running of the vehicle 10. In the idle stop control as one of the forms of fuel-efficiency increase control, the engine 14 is stopped with the clutch C1 being released during stop of the vehicle 10. In the deceleration economy running control as one of the forms of the fuel-efficiency increase control, the engine 14 is stopped with the clutch C1 being released during an inertia running of the vehicle 10 at a low running speed (namely, during a decelerated running shortly before being stopped). In the free-run control as one of the forms of the fuel-efficiency increase control, the engine 14 is stopped with the clutch C1 being released during an inertia running of the vehicle 10 at a middle or high speed. In the neutral control as one of the forms of the fuel-efficiency increase control, the engine 14 is operated in its idling state with the clutch C1 being released during stop of the vehicle 10. In the neutral inertia running control as one of the forms of the fuel-efficiency increase control, the engine 14 is operated in its idling state with the clutch C1 being released during an inertia running of the vehicle 10.

The execution of the fuel-efficiency increase control leads to an improvement in an actual fuel efficiency, but could cause a delay in start or acceleration, due to necessity of restart of the engine 14 or engagement of the clutch C1 when the vehicle 10 should be restarted or accelerated again. Such a reduction in the responsiveness upon start or acceleration could be a factor causing the vehicle operator to feel uncomfortable. It might be possible to inhibit the fuel-efficiency increase control (namely, not execute the fuel-efficiency increase control) when an acceleration intention of the vehicle operator is high as in a case of the manual shifting mode and/or the sport mode being selected. However, since the improvement of the fuel efficiency is reduced by the inhibition of the fuel-efficiency increase control, it is desirable to minimize the inhibition of the fuel-efficiency increase control as long as the vehicle operator does not feel uncomfortable.

It can be considered that a vehicle operator is less likely to feel uncomfortable with respect to the responsiveness upon start or acceleration in an area in which a difference between an acceleration representative value representing an acceleration of the vehicle 10 required by the vehicle operator when the fuel-efficiency increase control has been executed and an acceleration representative value representing an acceleration of the vehicle 10 required by the vehicle operator when the fuel-efficiency increase control has not been executed, is small. On the other hand, it can be considered that the vehicle operator is more likely to feel uncomfortable with respect to the responsiveness upon start or acceleration in an area in which the above-described difference is large. In the present embodiment, it is suggested that (i) collecting data relating to the acceleration representative value representing the acceleration actually required by operators of the vehicle 10 and the other vehicles 110 in each area, (ii) obtaining a tendency relating to the actually required acceleration in each area, based on the collected data, (iii) determining area or areas in which the fuel-efficiency increase control is to be inhibited from being executed, based on the obtained tendency, and (iv) inhibiting execution of the fuel-efficiency increase control in the inhibited area or areas. That is, in the present embodiment, it is suggested that determining a condition (hereinafter referred to as "control execution condition") that is to be satisfied for executing the fuel-efficiency increase control, based on the above-described tendency, and executing the fuel-efficiency increase control, depending on whether the control execution condition is satisfied or not. It is noted that the acceleration representative value representing the actually required acceleration may be, for example, a drive-force related value such as a required drive force and an amount of change of the required drive force. In the following description, the throttle opening degree tap is used as an example of the required drive force. The load reduction control portion 56 is capable of executing the fuel-efficiency increase control in various manners or forms such as the above-described idle stop control, deceleration economy running control, free-run control, neutral control and neutral inertia running control.

The electronic control device 50 further includes a vehicle-state determining means or portion in the form of a vehicle-state determining portion 58, an information processing means or portion in the form of an information processing portion 60 and a load-reduction control inhibiting means or portion in the form of a load-reduction control inhibiting portion 62, for performing various controls for suitably inhibiting the fuel-efficiency increase control.

The vehicle-state determining portion 58 determines whether the fuel-efficiency increase control has been executed or not during the last stop or last inertia running of the vehicle 10. When the vehicle 10 is restarted after the stop, for example, the idle stop control or neutral control as one of the forms of the fuel-efficiency increase control could have been executed during the last stop. When the vehicle 10 is re-accelerated after the inertia running, for example, the deceleration economy running control, free-run control or neutral inertia running control as one of the forms of the fuel-efficiency increase control could have been executed during the last inertia running.

Upon restart or re-acceleration after stop or inertia running of the vehicle 10, if the vehicle-state determining portion 58 determines that the fuel-efficiency increase control has been executed during the stop or inertia running, the information processing portion 60 determines in which form or manner the fuel-efficiency increase control has been executed, namely, obtains a content of the fuel-efficiency increase control executed during the last stop or last inertia running. Upon restart or re-acceleration after stop or inertia running of the vehicle 10, the information processing portion 60 generate a control information Ic containing: (i) a first data (control signal) indicative of status of execution of the fuel-efficiency increase control (i.e., data indicative of whether the fuel-efficiency increase control has been executed or not, and also the content of the fuel-efficiency increase control in case of the execution), (ii) a second data indicative of the acceleration representative value (representing the acceleration required upon restart or re-acceleration of the vehicle 10) in the form of the throttle opening degree tap and an amount Δtap (hereinafter referred to as "throttle change amount Δtap") of change of the throttle opening degree tap, and (iii) a third data in the form of the location information Svp indicative of the current location of the vehicle 10. The first data and second data are associated with the third data in the generated control information Ic. It is noted the control information Ic is generated for each one of the various manners or forms of the fuel-efficiency increase control. After generating the control information Ic, the information processing portion 60 transfers the control information Ic to the center 100 via the transceiver 28. It is also noted that the throttle change amount Δtap represents the change amount within a length of time corresponding to a control cycle, and corresponds to a rate of change of the throttle opening degree tap.

To the center 100, an information substantially the same as the above-described control information Ic is transferred from each one of the other vehicles 110, as the control information Ic is transferred from the vehicle 10. The center 100 calculates a throttle opening-degree difference T that is a difference between the throttle opening degree tap (as an example of the acceleration representative value) when the fuel-efficiency increase control has been executed in each area and the throttle opening degree tap when the fuel-efficiency increase control has not been executed in the same area, namely, a difference between the throttle opening degree tap in case with execution of the fuel-efficiency increase control in each control information Ic and the throttle opening degree tap in case without execution of the fuel-efficiency increase control in the control informations Ic that are same in terms of the location information Svp. The calculation of the throttle opening-degree difference T is made for each of the forms or manners of the fuel-efficiency increase control. Where there are a plurality of values of the throttle opening degree tap in case with or without execution of the fuel-efficiency increase control in the same area, an average of the plurality of values is used, for example. Similarly, the center 100 calculates a throttle change-amount difference ΔT that is a difference between the throttle change amount Δtap (as an example of the acceleration representative value) when the fuel-efficiency increase control has been executed in each area and the throttle change amount Δtap when the fuel-efficiency increase control has not been executed in the same area, namely, a difference between the throttle change amount Δtap in case with execution of the fuel-efficiency increase control in each control information Ic and the throttle change amount Δtap in case without execution of the fuel-efficiency increase control in the control informations Ic that are same in terms of the location information Svp. The calculation of the throttle change-amount difference ΔT is made for each of the forms or manners of the fuel-efficiency increase control. Where there are a plurality of values of the throttle change amount Δtap in case with or without execution of the fuel-efficiency increase control in the same area, an average of the plurality of values is used, for example. Then, the center 100 determines whether the above-described throttle opening degree T is larger a first threshold value Tf or not, and determines whether the above-described throttle change-amount difference ΔT is larger than a second threshold value ΔTf. The center 100 is configured, in a case where the throttle opening-degree difference T and the throttle change-amount difference ΔT in an area are larger than the respective first and second threshold values Tf, ΔTf, to determine that the area (i.e., the vehicle location represented by the location information Svp) as an inhibited area in which the fuel-efficiency increase control is inhibited from being executed. Thus, where the difference between the acceleration representative value representing the required acceleration when the fuel-efficiency increase control has been executed and the acceleration representative value representing the required acceleration when the fuel-efficiency increase control has not been executed is larger than a threshold value, an area indicated by the location information Svp that is associated with the acceleration representative value is set as the inhibited area in which the execution of the fuel-efficiency increase control is inhibited. It is noted that the term "area" may be interpreted to mean a zone having a predetermined range, wherein it is considered that a tendency of the acceleration required by a vehicle driver is substantially the same in any part of the zone (area) so that the control information ID in any part of the zone (area) can be treated as information relating to the same point. The threshold value (first threshold value Tf and second threshold value ΔTf) is an upper limit value, beyond which it is determined that the acceleration representative value representing the acceleration after execution of the fuel-efficiency increase control is increased to such a degree that represents that vehicle operator feels uncomfortable with delay in the responsiveness upon start or acceleration. The threshold value (first threshold value Tf and second threshold value ΔTf) may be a given value that varies depending on area (i.e., vehicle location represented by the location information Svp), for example, depending on type of running road such as flat road, uphill road, downhill road, road intersection and road junction. The center 100 has a control inhibition map indicating an inhibited area or areas in which execution of the fuel-efficiency increase control is to be inhibited. When an area is newly set as the inhibited area, the control inhibition map is updated to reflect the new setting. It is noted that the control inhibition map is prepared for each one of the various forms of the fuel-efficiency increase control.

After a power ON such as an ignition ON in the vehicle 10, the information processing portion 60 receives, from the center 100 via the transceiver 28, an information Imap containing the control inhibition map prepared for each one of the various forms of the fuel-efficiency increase control, as needed.

The load-reduction control inhibiting portion 62 obtains the location information Svp indicative of the current location of the vehicle 10, and determines whether the current location of the vehicle 10 corresponds to an area in which execution of the fuel-efficiency increase control is to be inhibited, by using the control inhibition map contained in the information Imap. This determination is made for each of the forms of the fuel-efficiency increase control. When having determined that the current location of the vehicle 10 corresponds to the area in which the fuel-efficiency increase control is to be inhibited, the load-reduction control inhibiting portion 62 outputs a command inhibiting the execution of the fuel-efficiency increase control, and the inhibiting command is supplied to the load reduction control portion 56. On the other hand, when having determined that the current location of the vehicle 10 does not correspond to the area in which the fuel-efficiency increase control is to be inhibited, the load-reduction control inhibiting portion 62 outputs a command allowing the execution of the fuel-efficiency increase control, and the allowing command is supplied to the load reduction control portion 56. It is noted that the inhibiting command and the allowing command are outputted for each of the forms of the fuel-efficiency increase control.

The control inhibition map, which is stored in the center 100, is a map that is indicative of the inhibited area or areas the fuel-efficiency increase control is to be inhibited from being executed. The control inhibition map corresponds to a control inhibition condition which relates to the location of the vehicle 10 and which is to be satisfied for inhibiting execution of the fuel-efficiency increase control. It is preferable that the control inhibition map has been prepared even for an area in which the vehicle 10 has never run and will run for the first time. To this end, the control inhibition map for such an area is prepared based on the control information Ic transferred from the other vehicle 110. Thus, the load-reduction control inhibiting portion 62 inhibits the fuel-efficiency increase control, depending on whether the control inhibition condition is satisfied or not, wherein the control inhibition condition is prepared based on the control information Ic which is transferred from at least one of the other vehicles 110 and which contains the data indicative of the acceleration representative value representing the acceleration required by the vehicle operator and associated with the location information Svp. The control inhibition condition is set for each of the various forms of the fuel-efficiency increase control. Thus, when the control inhibition condition set for one or ones of the various forms of the fuel-efficiency increase control is satisfied, the load-reduction control inhibiting portion 62 inhibits the fuel-efficiency increase control from being executed in the one or ones of the various forms.

In other words, the control inhibition map, which is stored in the center 100, is a map indicating that execution of the fuel-efficiency increase control is allowed in an area or areas other than the above-described inhibited area or areas. In this sense, the control inhibition map may be interpreted to correspond to a control execution condition which relates to the location of the vehicle 10 and which is to be satisfied for allowing execution of the fuel-efficiency increase control. Thus, the load reduction control portion 56 executes the fuel-efficiency increase control, depending on whether the control execution condition is satisfied or not, wherein the control execution condition is prepared based on the control information Ic which is transferred from at least one of the other vehicles 110 and which contains the data indicative of the acceleration representative value representing the acceleration required by the vehicle operator and associated with the location information Svp. In a case where the difference between the acceleration representative value associated with the location information Svp indicative of an area in case with execution of the fuel-efficiency increase control and that in case without execution of the fuel-efficiency increase control is larger than the threshold value, the load reduction control portion 56 does not execute the fuel-efficiency increase control in the above-described area indicated by the location information Svp.

Figure 3:
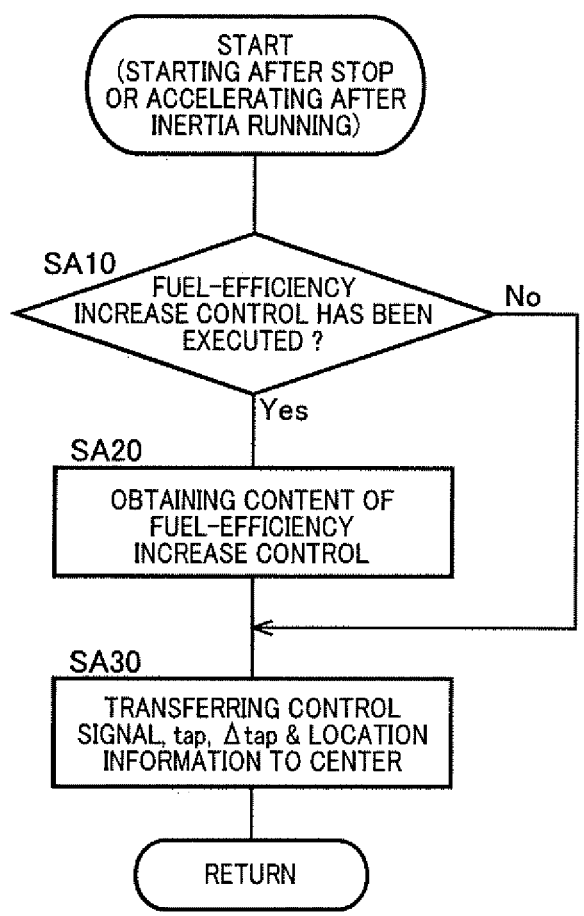
FIG. 3 is a flow chart showing a part of control routine that is executed by an electronic control device, so as to restrain reduction in improvement of fuel efficiency, which reduction could be caused when the fuel-efficiency increase control is inhibited.
Figure 4:
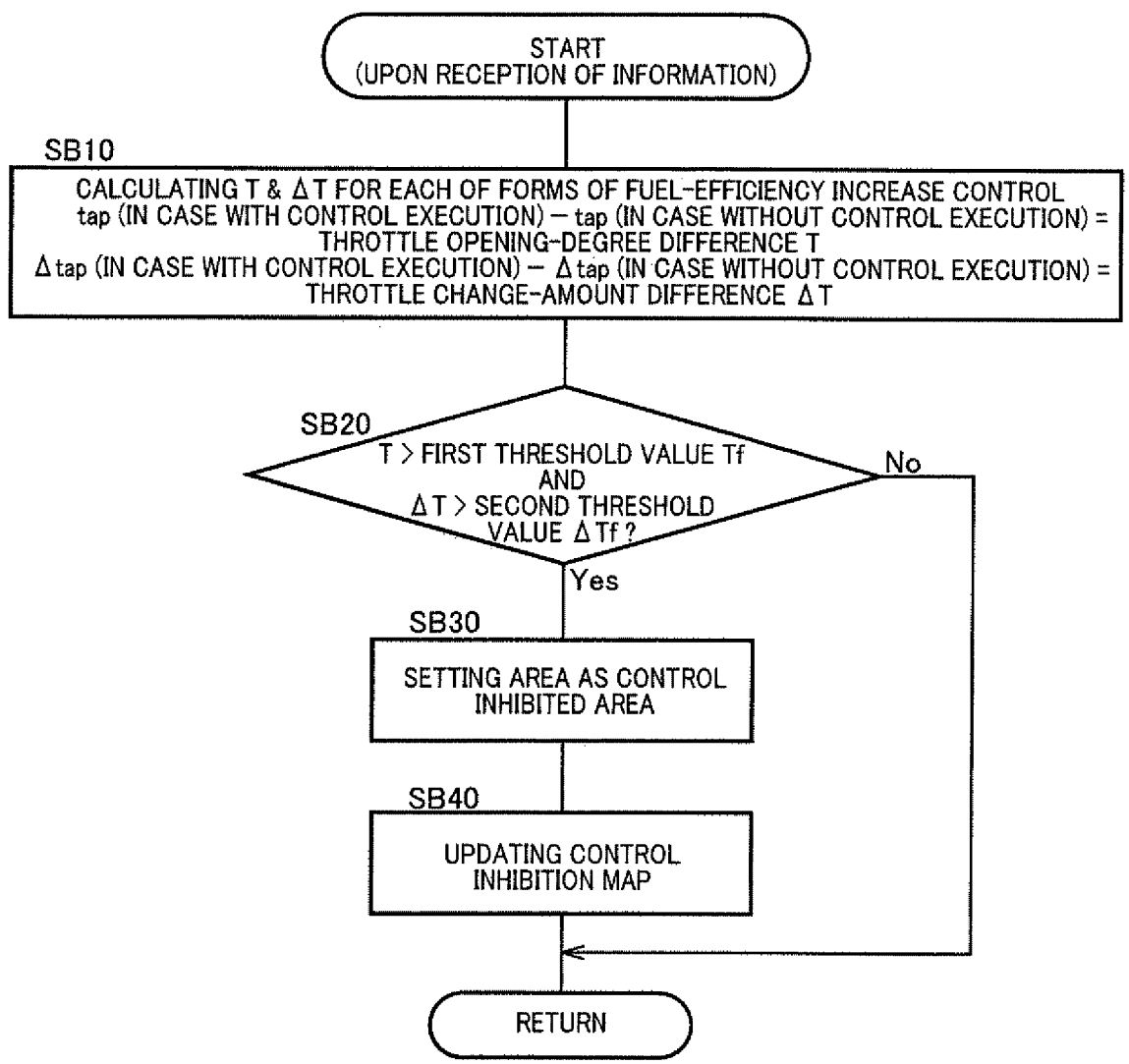
FIG. 4 is flow chart showing a part of control routine that is executed by a center, so as to restrain reduction in improvement of fuel efficiency, which reduction could be caused when the fuel-efficiency increase control is inhibited.
Figure 5:
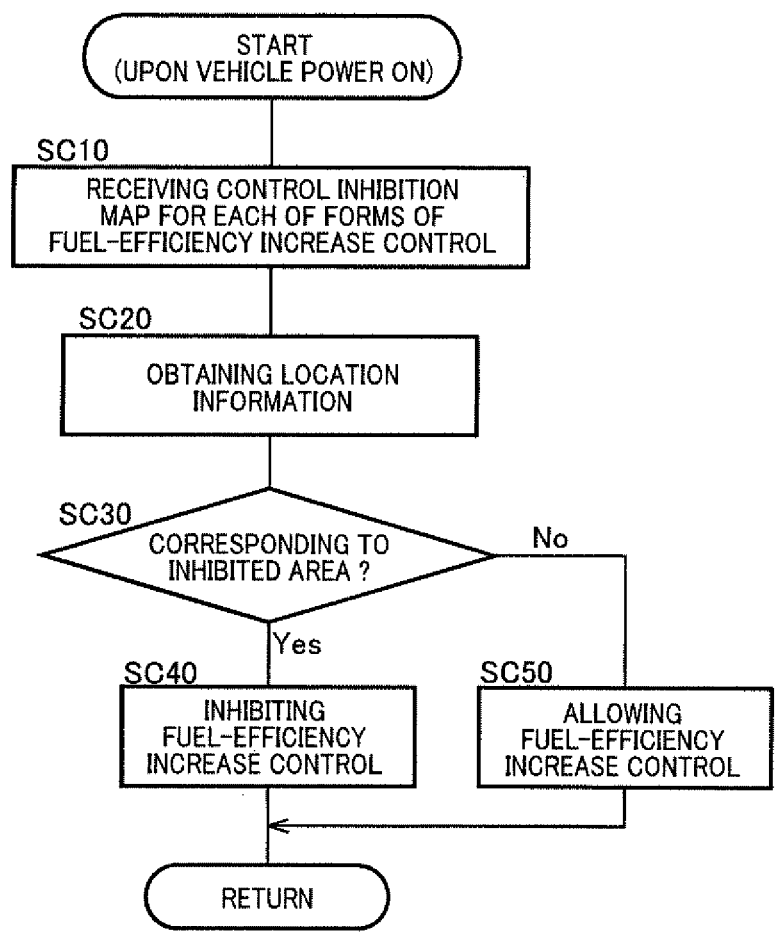
FIG. 5 is a flow chart showing a part of control routine that is executed by the electronic control device, so as to restrain reduction in improvement of fuel efficiency, which reduction could be caused when the fuel-efficiency increase control is inhibited.

Each of FIGS. 3-5 is a flow chart showing a control routine that is executed to restrain reduction in improvement of fuel efficiency, which reduction could be caused when the fuel-efficiency increase control is inhibited. The control routines of FIGS. 3 and 5 are executed in the electronic control device 50. The control routine of FIG. 4 is executed in the center 100.

The control routine of FIG. 3 is initiated with step SA10 (hereinafter simply referred to as "SA10" as well as the other steps) corresponding to the function of the vehicle-state determining portion 58. The SA10 is implemented upon restart or re-acceleration after stop or inertia running of the vehicle 10, to determine whether the fuel-efficiency increase control has been executed during the stop or inertia running. If an affirmative determination is made at the SA10, the control flow goes to SA20 corresponding to the function of the information processing portion 60, to obtain the content of the fuel-efficiency increase control. If a negative determination is made at the SA10, the control flow goes to SA30 corresponding to the function of the information processing portion 60, to generate the control information Ic containing: (i) the first data (control signal) indicative of the status of execution of the fuel-efficiency increase control, (ii) the second data indicative of the acceleration representative value in the form of the throttle opening degree tap and the throttle change amount Δtap and (iii) the third data in the form of the location information Svp, wherein the first data and second data are associated with the third data in the generated control information Ic. In the SA30, the control information Ic is thus generated for each one of the various forms of the fuel-efficiency increase control, and the generated control information Ic is transferred to the center 100 via the transceiver 28. It is noted that the SA30 is implemented also after implementation of the SA20.

The control routine of FIG. 4 is initiated with SB10 corresponding to the function of a required-acceleration difference calculating portion. The SB10 is implemented upon reception of the control information Ic, to calculate the throttle opening-degree difference T (=tap (in case with execution of the fuel-efficiency increase control)−tap (in case without execution of the fuel-efficiency increase control)) and the throttle change-amount difference ΔT (=Δtap (in case with execution of the fuel-efficiency increase control)−Δtap (in case without execution of the fuel-efficiency increase control)) in the control informations Ic that are the same in terms of the location information Svp. The SB10 is followed by SB20 corresponding to the function of a required acceleration difference determining portion. In the SB20, it is determined whether the throttle opening degree T is larger than the first threshold value Tf and also the throttle change-amount difference ΔT is larger than the second threshold value ΔTf. If a negative determination is made at the SB20, one cycle of execution of the control routine is terminated. If an affirmative determination is made at the SB20, the control flow goes to SB30 corresponding to the function of an inhibited-area setting portion. In the SB30, an area indicated by the location information Svp is set as the inhibited area in which execution of the fuel-efficiency increase control is to be inhibited. The SB30 is followed by SB40 corresponding to a map updating portion, to update the control inhibition map, which has been prepared for each one of the various forms of the fuel-efficiency increase control, such that the updated control inhibition map reflects the inhibited area setting made at the SB30.

The control routine of FIG. 5 is initiated with SC10 corresponding to the function of the information processing portion 60. The SC10 is implemented after power-ON of the vehicle 10, to receive the information Imap containing the control inhibition map prepared for each one of the various forms of the fuel-efficiency increase control, from the center 100 via the transceiver 28. The SC10 is followed by SC20 corresponding to the load-reduction control inhibiting portion 62, to obtain the location information Svp indicative of the current location of the vehicle 10. Then, SC30 corresponding to the load-reduction control inhibiting portion 62 is implemented to determine whether the current location of the vehicle 10 corresponds to the inhibited area in which the fuel-efficiency increase control is inhibited from being executed in each one of the various manners or forms, by using the control inhibition map contained in the information Imap. This determination is made for each one of the various forms of the fuel-efficiency increase control. If an affirmative determination is made at the SC30, the control flow goes to SC40 corresponding to the load-reduction control inhibiting portion 62, to inhibit the fuel-efficiency increase control from being executed in the corresponding one or ones of the various forms. If a negative determination is made at the SC30, the control flow goes to SC50 corresponding to the load-reduction control inhibiting portion 62, to allow the fuel-efficiency increase control to be executed in the corresponding one or ones of the various forms.

As described above, in the present embodiment, the fuel-efficiency increase control is executed for stopping the engine 14 and/or disconnecting the engine 14 from the drive wheels 22 in each area, depending on whether the control execution condition is satisfied or not, wherein the control execution condition is set based on information which is transferred from other vehicle or vehicles 110 and which includes the acceleration representative value (representing the required acceleration of the other vehicle or vehicles 110 required by the vehicle operator or operators) that is associated with the location information Svp indicative of the same area. Thus, it is possible to stop the engine 14 and/or disconnect the engine 14 from the drive wheels 22, or neither stop the engine 14 nor disconnect the engine 14 from the drive wheels 22 in each area, in accordance with an actual tendency of the required acceleration in the same area. For example, even in a case where an acceleration intention of the vehicle operator is high, the engine 14 can be stopped and/or the engine 14 can be disconnected from the drive wheels 22, depending on the actual tendency of the required acceleration in each area. It is therefore possible to restrain reduction in improvement of fuel efficiency, which reduction could be caused in an arrangement in which the fuel-efficiency increase control is inhibited always in the case where the acceleration intention of the operator is high.

In the present embodiment, the fuel-efficiency increase control is not executed, namely, the engine 14 is not stopped and the engine 14 is not disconnected from the drive wheels 22, in the area indicated by the location information, where the difference between the acceleration representative value in case with execution of the fuel-efficiency increase control and the acceleration representative value in case without execution of the fuel-efficiency increase control is larger than the threshold value. Thus, it is possible to stop the engine 14 and/or disconnect the engine 14 from the drive wheels 22, or neither stop the engine 14 nor disconnect the engine 14 from the drive wheels 22 in each area, in accordance with the actual tendency of the required acceleration in the same area.

In the present embodiment, the above-described threshold value (first threshold value Tf, second threshold value ΔTf), based on which the above-described difference is determined to be large or small, is a given value that varies depending on an area indicated by the location information Svp that is associated with the acceleration representative value. Thus, the determination as to whether the above-described difference is large or small, i.e., the determination as to whether the fuel-efficiency increase control should be inhibited or allowed in each area can be made suitably depending on the type of running road (such as flat road, uphill road and downhill road) in the same area.

There will be described other embodiments of this invention. The same reference signs as used in the above-described first embodiment will be used in the following embodiments, to identify the functionally corresponding elements.

Second Embodiment

In the above-described first embodiment, there has been described the control inhibition map stored in the center 100, as an example of the control inhibition condition which relates to the location of the vehicle and which is to be satisfied for inhibiting execution of the fuel-efficiency increase control. In the present second embodiment, the control inhibition condition (in other words, control execution condition) is set by taking account of an acceleration intention of the vehicle operator in addition to the control inhibition map. It is considered that the vehicle operator feels uncomfortable with delay in the responsiveness upon start or acceleration of the vehicle, by a degree that varies depending on a degree of the acceleration intention of the vehicle operator. Thus, the degree of the acceleration intention of the vehicle operator is reflected in the control inhibition condition. The degree of the acceleration intention of the vehicle operator is represented by, for example, which one of the drive force performance and the fuel efficiency performance is given more importance by the vehicle operator. A case where the acceleration intention of the vehicle operator is high corresponds to a case where the vehicle operator gives more importance to the drive force performance rather than to the fuel efficiency performance, such as a case where the manual position M is selected as the operation position POSsh (i.e., case where the manual shifting mode is established) and a case where the sport mode is selected by the drive-mode selector switch 44. On the other hand, a case where the acceleration intention of the vehicle operator is not high (or low) corresponds to a case where the vehicle operator gives more importance to the fuel efficiency performance rather than to the drive force performance, such as a case where the drive position D is selected as the operation position POSsh (i.e., case where the automatic shifting mode is established) and a case where the normal mode (or the economy mode) is selected by the drive-mode selector switch 44.

Specifically described, in an area that is designated as the inhibited area by the control inhibition map (i.e., in an area in which the difference between the acceleration representative value in case with execution of the fuel-efficiency increase control and the acceleration representative value in case without execution of the fuel-efficiency increase control tends to be large), the load-reduction control inhibiting portion 62 allows execution of the fuel-efficiency increase control in the same area when the operator's acceleration intention is low (for example, when the economy mode is selected), and inhibits execution of the fuel-efficiency increase control in the same area when the operator's acceleration intention is high (for example, when the manual shifting mode or sport mode is selected). That is, even in an area in which the above-described difference in terms of the required acceleration is larger than the above-described threshold value, the load-reduction control inhibiting portion 62 allows execution of the fuel-efficiency increase control when the vehicle operator gives more importance to the fuel efficiency performance rather than to the drive force performance. In other words, the load reduction control portion 56 determines whether executing the fuel-efficiency increase control or not, depending on information (e.g., control information Ic) of the acceleration representative value representing the required acceleration and also which one of the drive force performance and the fuel efficiency performance is given more importance by the vehicle operator, and executes the fuel-efficiency increase control even in an area in which the above-described difference in terms of the required acceleration is larger than the above-described threshold value, when the fuel efficiency performance is given more importance. Further, the load-reduction control inhibiting portion 62 allows the fuel-efficiency increase control to be executed in an area in which the execution of the fuel-efficiency increase control is not inhibited in the control inhibition map (i.e., in an area in which the difference between the acceleration representative value in case with execution of the fuel-efficiency increase control and the acceleration representative value in case without execution of the fuel-efficiency increase control tends to be small), irrespective of a degree of the acceleration intention of the vehicle operator. That is, even when the vehicle operator gives more importance to the drive force performance rather than to the fuel efficiency performance, the load-reduction control inhibiting portion 62 allows execution of the fuel-efficiency increase control in an area in which the above-described difference in terms of the required acceleration is not larger than the above-described threshold value. In other words, the load reduction control portion 56 determines whether executing the fuel-efficiency increase control or not, depending on information of the acceleration representative value representing the required acceleration and also which one of the drive force performance and the fuel efficiency performance is given more importance by the vehicle operator, and executes the fuel-efficiency increase control in an area in which the above-described difference in terms of the required acceleration is not larger than the above-described threshold value, even when the drive force performance is given more importance. Thus, in the present embodiment, it is determined whether execution of the fuel-efficiency increase control is to be inhibited or not, depending on the information of the acceleration representative value representing the required acceleration and also which one of the drive force performance and the fuel efficiency performance is given more importance by the vehicle operator.

In the present second embodiment, even in a case where more importance is given to the drive force performance (namely, even in a case where the operator's acceleration intention is high), execution of the fuel-efficiency increase control is allowed and the fuel-efficiency increase control can be executed in an area in which the difference between the acceleration representative value in case with execution of the fuel-efficiency increase control and the acceleration representative value in case without execution of the fuel-efficiency increase control tends to be small.

Third Embodiment

In the above-described first and second embodiments, the control inhibition condition (in other words, control execution condition) is set by using the above-described difference in the acceleration representative value representing the acceleration required by the operator between the case with execution of the fuel-efficiency increase control and the case without execution of the fuel-efficiency increase control. It can be considered that the vehicle operator is less likely to feel uncomfortable with delay in the responsiveness upon start or acceleration in an area in which the acceleration representative value representing the acceleration required by the operator tends to be small. On the other hand, it can be considered that the vehicle operator is more likely to feel uncomfortable with delay in the responsiveness upon start or acceleration in an area in which the acceleration representative value tends to be large. In view of these, in the present third embodiment, the control inhibition condition is set by using the acceleration representative value.

Described specifically, in the present third embodiment, the arrangements of the above-described first and second embodiments are replaced by an arrangement in which the center 100 determines whether the throttle opening degree tap contained in each control information Ic that contains the location information Svp is larger than a first threshold value tapf or not, and also determines whether the throttle change amount Δtap contained in each control information Ic that contains the location information Svp is larger than a second threshold value tapf or not. Each of the throttle opening degree tap and the throttle change amount Δtap may be, for example, a value in case with execution of the fuel-efficiency increase control, or may be an average of a value in case with execution of the fuel-efficiency increase control and a value in case without execution of the fuel-efficiency increase control. When the throttle opening degree tap is larger than the first threshold value tapf and the throttle change amount Δtap is larger than the second threshold value Δtapf, the center 100 sets an area indicated by the location information Svp, as the inhibited area in which the fuel-efficiency increase control is to be inhibited. Thus, in the present third embodiment, when the acceleration representative value representing the acceleration required by the operator is larger than the threshold value, the area indicated by the location information Svp is set as the inhibited area in which the fuel-efficiency increase control is to be inhibited. The threshold value (first threshold value tapf and second threshold value Δtapf) is an upper limit value, beyond which it is determined that the acceleration representative value representing the acceleration after execution of the fuel-efficiency increase control is increased to such a degree that represents that vehicle operator desires quick response upon start or acceleration. The threshold value (first threshold value tapf and second threshold value Δtapf) may be a value that varies depending on area (i.e., vehicle location represented by the location information Svp), for example, depending on type of road such as flat road, uphill road and downhill road.

Thus, when the acceleration representative value representing the acceleration required by the operator and associated with the location information Svp is larger than the threshold value, the load reduction control portion 56 does not execute the fuel-efficiency increase control in an area indicated by the location information Svp.

In the present third embodiment, the control inhibition condition may be set by taking account of the acceleration intention of the vehicle operator in addition to the control inhibition map, as in the above-described second embodiment. That is, even in an area in which the above-described difference in terms of the required acceleration is larger than the above-described threshold value, the load-reduction control inhibiting portion 62 may allow execution of the fuel-efficiency increase control when the vehicle operator gives more importance to the fuel efficiency performance rather than to the drive force performance. In other words, the load reduction control portion 56 may determine whether executing the fuel-efficiency increase control or not, depending on information (e.g., control information Ic) of the acceleration representative value representing the required acceleration and also which one of the drive force performance and the fuel efficiency performance is given more importance by the vehicle operator, and may execute the fuel-efficiency increase control even in an area in which the above-described difference in terms of the required acceleration is larger than the above-described threshold value, when the fuel efficiency performance is given more importance. Further, the load-reduction control inhibiting portion 62 may allow the fuel-efficiency increase control to be executed in an area in which the execution of the fuel-efficiency increase control is not inhibited in the control inhibition map (i.e., in an area in which the difference between the acceleration representative value in case with execution of the fuel-efficiency increase control and the acceleration representative value in case without execution of the fuel-efficiency increase control tends to be small), even when the vehicle operator gives more importance to the drive force performance rather than to the fuel efficiency performance. In other words, the load reduction control portion 56 may determine whether executing the fuel-efficiency increase control or not, depending on information of the acceleration representative value representing the required acceleration and also which one of the drive force performance and the fuel efficiency performance is given more importance by the vehicle operator, and may execute the fuel-efficiency increase control in an area in which the above-described difference in terms of the required acceleration is not larger than the above-described threshold value, even when the drive force performance is given more importance. Thus, in the present third embodiment, it may be determined whether execution of the fuel-efficiency increase control is to be inhibited or not, depending on the information of the acceleration representative value representing the required acceleration and also which one of the drive force performance and the fuel efficiency performance is given more importance by the vehicle operator.

Figure 6:
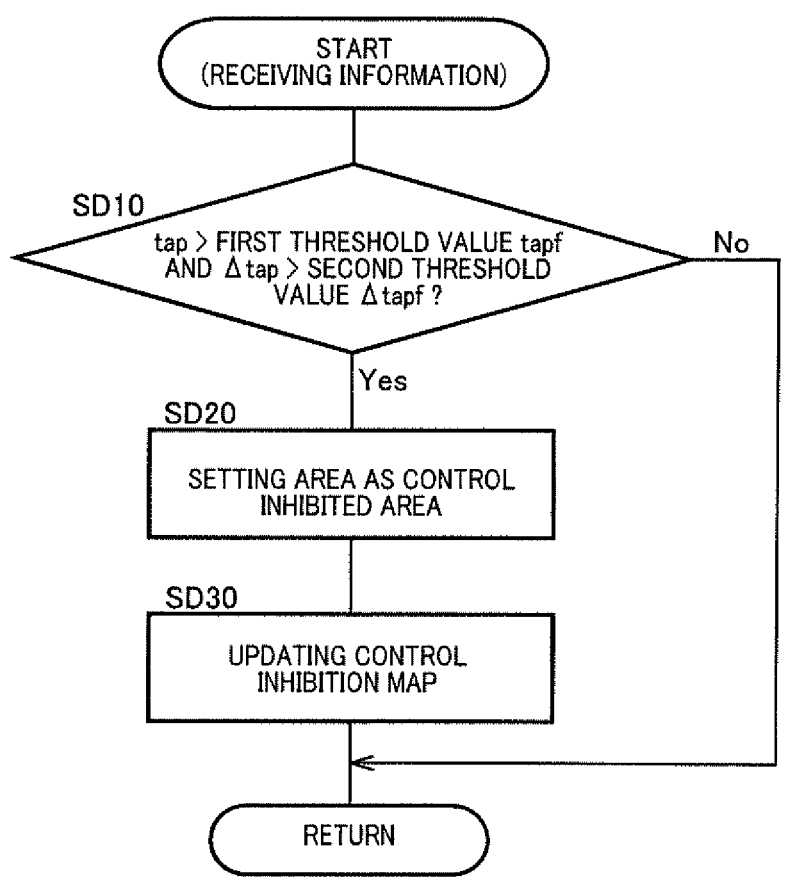
FIG. 6 is flow chart showing a part of control routine executed that is executed, in place of the control routine shown in FIG. 4, by the center, so as to restrain reduction in improvement of fuel efficiency, which reduction could be caused when the fuel-efficiency increase control is inhibited.

FIG. 6 is a flow chart showing control routine that is executed to restrain reduction in improvement of fuel efficiency, which reduction could be caused when the fuel-efficiency increase control is inhibited. This control routine is executed, in place of the control routine of FIG. 7, in the center 100.

The control routine of FIG. 6 is initiated with SD10 corresponding to the function of an acceleration-requirement determining portion. The SD10 is implemented upon reception of the control information Ic, to determine whether the throttle opening degree tap is larger than the first threshold value tapf and also the throttle change amount Δtap is larger than the second threshold value Δtapf in the control information Ic that contains the location information Svp. If a negative determination is made at the SD10, one cycle of execution of the control routine is terminated. If an affirmative determination is made at the SD10, the control flow goes to SD20 corresponding to the function of the inhibited-area setting portion. In the SD20, an area indicated by the location information Svp is set as the inhibited area in which the fuel-efficiency increase control is to be inhibited. The SD20 is followed by SD30 corresponding to the map updating portion, to update the control inhibition map, which has been prepared for each one of the various forms of the fuel-efficiency increase control, such that the updated control inhibition map reflects the inhibited area setting made at the SD20.

As described above, like in the above-described first and second embodiments, in the present third embodiment, it is possible to restrain reduction in improvement of fuel efficiency, which reduction could be caused by inhibiting the fuel-efficiency increase control.

In the present third embodiment, in a case where the acceleration representative value associated with the location information Svp indicative of an area is larger than the threshold value, the fuel-efficiency increase control is not executed in the same area, so that it is possible to stop the engine 14 and/or disconnect the engine 14 from the drive wheels 22, or neither stop the engine 14 nor disconnect the engine 14 from the drive wheels 22 in each area, in accordance with an actual tendency of the required acceleration in the same area.

In the present third embodiment, the fuel-efficiency increase control is allowed to stop the engine 14 and/or disconnect the engine 14 from the drive wheels 22 in an area in which the acceleration representative value tends to be small, even when the drive force performance is given more importance, namely, even when the operator's acceleration intention is high.

In the present third embodiment, the threshold value (first threshold value tapf and second threshold value Δtapf) is a given value that varies depending on an area, and the control execution condition, which is to be satisfied for executing the fuel-efficiency increase control, are determined depending on area, for example, depending on type of running road such as flat road, uphill road and downhill road.

Fourth Embodiment

In the above-described first through third embodiments, the inhibition of the fuel-efficiency increase control is limited by setting the control inhibition map. However, even with the arrangement of limitation on the inhibition, there is a case where the reduction of the actual fuel efficiency is made large. Further, depending on a running area, there is a case where the fuel-efficiency increase control is inhibited from being executed in not only one of the various forms but also two or more of the various forms. The risk of reduction of the actual fuel efficiency is increased with increase of the number of the inhibited forms In view of this, in the present embodiment, in a case where the fuel efficiency is reduced by a large degree as a consequence of inhibition of the fuel-efficiency increase control, the inhibition of the fuel-efficiency increase control is cancelled to restrain the reduction of the actual fuel efficiency. In a case where the fuel-efficiency increase control is inhibited from being executed in two or more of the various forms, the inhibitions of the two or more forms of the fuel-efficiency increase control are cancelled one by one, so as to restrain the reduction of the actual fuel efficiency.

Specifically described, the vehicle-state determining portion 58 determines whether the actual fuel efficiency is reduced by at least a threshold ratio, namely, determines whether a reduction ratio of the actual fuel efficiency is at least the threshold ratio. The reduction ratio of the actual fuel efficiency is, for example, a ratio of reduction of an average of the actual fuel efficiency in the most recent period having a given length of time, relative to an average of the actual fuel efficiency in an earlier period (earlier than the most recent period) having a given length of time, or alternatively, a ratio of reduction of an average of the actual fuel efficiency in the most recent running over a given distance, relative to an average of the actual fuel efficiency in an earlier running (earlier than the most recent running) over a given distance. The above-described threshold ratio is an upper limit value, beyond which it is determined that the actual fuel efficiency is considerably reduced to such a degree that represents, for example, a need to cancel the inhibition of the fuel-efficiency increase control. Each of the above-described given length of time and given distance is a predetermined range required to, for example, observe the change of the actual fuel efficiency.

When the vehicle-state determining portion 58 determines that the reduction ratio of the actual fuel efficiency is not smaller than the threshold ratio, the load-reduction control inhibiting portion 62 cancels the inhibition of the fuel-efficiency increase control, by canceling the control inhibition map. When the vehicle-state determining portion 58 determines that the reduction ratio of the actual fuel efficiency is smaller than the threshold ratio, the load-reduction control inhibiting portion 62 withdraws the cancellation of the control inhibition map. In an arrangement where the fuel-efficiency increase control is executable in various forms, the control inhibition maps are prepared for the respective forms of the fuel-efficiency increase control. In this arrangement, the load-reduction control inhibiting portion 62 cancels the control inhibition maps one by one, or cancels the latest control inhibition map. Thus, while inhibiting the fuel-efficiency increase control, the load-reduction control inhibiting portion 62 keeps inhibiting or allows the fuel-efficiency increase control, depending on the reduction ratio of the actual fuel efficiency. In other words, while not executing the fuel-efficiency increase control, the load reduction control portion 56 executes the fuel-efficiency increase control when the reduction ratio of the actual fuel efficiency is not smaller than the threshold ratio.

Figure 7:
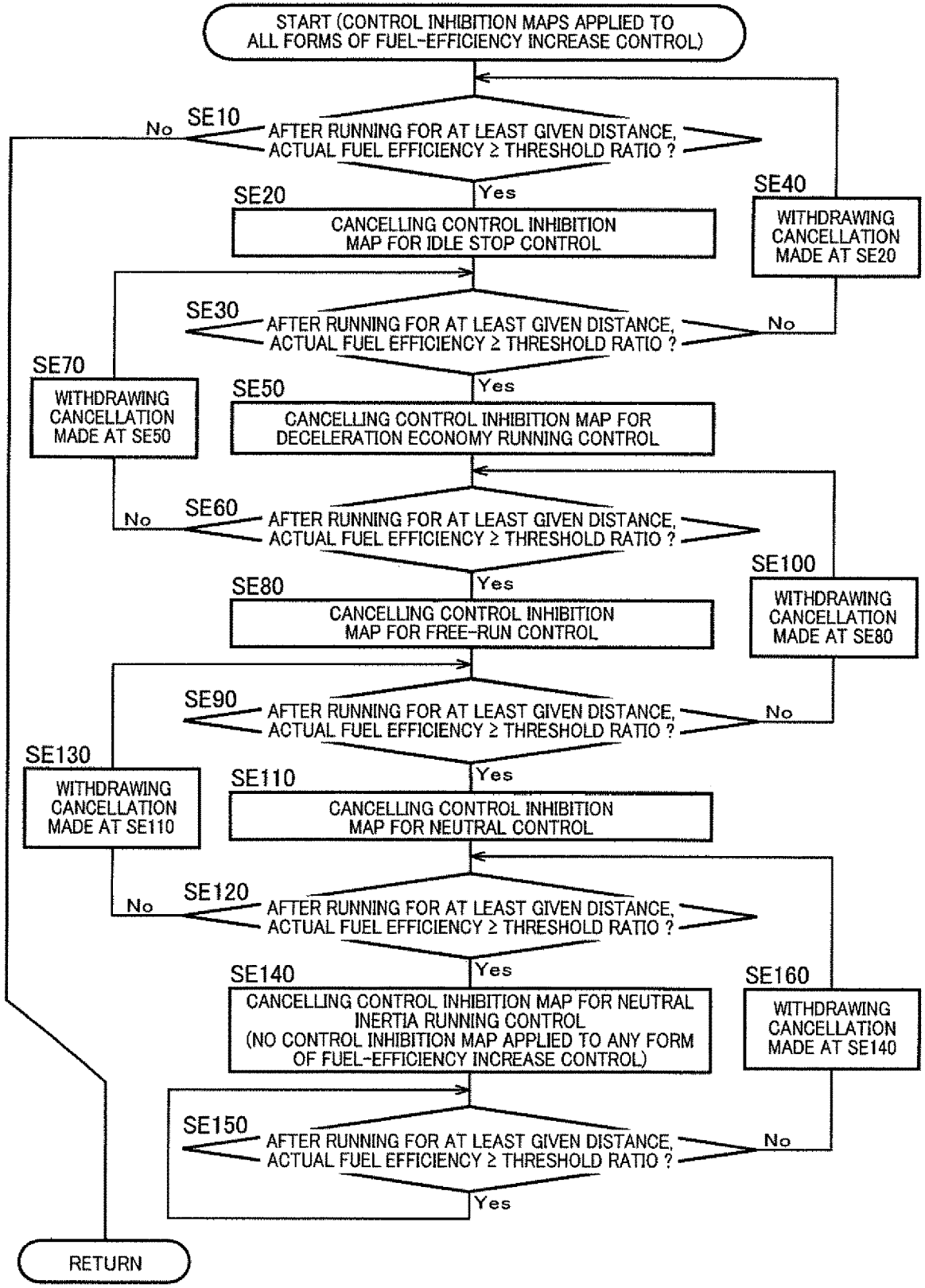
FIG. 7 is a flow chart showing a part of control routine that is executed by the electronic control device, so as to restrain reduction in improvement of fuel efficiency, which reduction could be caused when the fuel-efficiency increase control is inhibited.

FIG. 7 is a flow chart showing control routine that is executed to restrain reduction in improvement of fuel efficiency, which reduction could be caused when the fuel-efficiency increase control is inhibited. This control routine is executed in the electronic control device 50.

The control routine of FIG. 7 is initiated with SE10 corresponding to the function of the vehicle-state determining portion 58. The SE10 is implemented when any one of the modes of the fuel-efficiency increase control is subjected to a corresponding one of the control inhibition maps. In the SE10, after the vehicle has run for at least the given distance, it is determined whether the reduction ratio of the actual fuel efficiency is at least the threshold ratio. If a negative determination is made at the SE10, one cycle of execution of the control routine is terminated. If an affirmative determination is made at the SE10, the control flow goes to SE20 corresponding to the function of the load-reduction control inhibiting portion 62, to cancel the control inhibition map directed to the idle stop control as one of the modes of the fuel-efficiency increase control. Then, in SE30 corresponding to the function of the vehicle-state determining portion 58, after the vehicle has run for at least the given distance, it is determined whether the reduction ratio of the actual fuel efficiency is still at least the threshold ratio. If a negative determination is made at the SE30, the control flow goes to SE40 corresponding to the function of the load-reduction control inhibiting portion 62, to withdraw the cancellation of the control inhibition map directed to the idle stop control, which cancellation was made at the SE20. The SE40 is followed by the SE10. If an affirmative determination is made at the SE30, the control flow goes to SE50 corresponding to the function of the load-reduction control inhibiting portion 62, to cancel the control inhibition map directed to the deceleration economy running control as one of the modes of the fuel-efficiency increase control. Then, in SE60 corresponding to the function of the vehicle-state determining portion 58, after the vehicle has run for at least the given distance, it is determined whether the reduction ratio of the actual fuel efficiency is still at least the threshold ratio. If a negative determination is made at the SE60, the control flow goes to SE70 corresponding to the function of the load-reduction control inhibiting portion 62, to withdraw the cancellation of the control inhibition map directed to the deceleration economy running control, which cancellation was made at the SE50. The SE70 is followed by the SE30. If an affirmative determination is made at the SE60, the control flow goes to SE80 corresponding to the function of the load-reduction control inhibiting portion 62, to cancel the control inhibition map directed to the free-run control as one of the modes of the fuel-efficiency increase control. Then, in SE90 corresponding to the function of the vehicle-state determining portion 58, after the vehicle has run for at least the given distance, it is determined whether the reduction ratio of the actual fuel efficiency is still at least the threshold ratio. If a negative determination is made at the SE90, the control flow goes to SE100 corresponding to the function of the load-reduction control inhibiting portion 62, to withdraw the cancellation of the control inhibition map directed to the free-run control, which cancellation was made at the SE80. The SE100 is followed by the SE60. If an affirmative determination is made at the SE90, the control flow goes to SE110 corresponding to the function of the load-reduction control inhibiting portion 62, to cancel the control inhibition map directed to the neutral control as one of the modes of the fuel-efficiency increase control. Then, in SE120 corresponding to the function of the vehicle-state determining portion 58, after the vehicle has run for at least the given distance, it is determined whether the reduction ratio of the actual fuel efficiency is still at least the threshold ratio. If a negative determination is made at the SE120, the control flow goes to SE130 corresponding to the function of the load-reduction control inhibiting portion 62, to withdraw the cancellation of the control inhibition map directed to the neutral control, which cancellation was made at the SE110. The SE130 is followed by the SE90. If an affirmative determination is made at the SE120, the control flow goes to SE140 corresponding to the function of the load-reduction control inhibiting portion 62, to cancel the control inhibition map directed to the neutral inertia running control as one of the modes of the fuel-efficiency increase control, so that any one of the modes of the fuel-efficiency increase control is not subjected to the corresponding control inhibition map. Then, in SE150 corresponding to the function of the vehicle-state determining portion 58, after the vehicle has run for at least the given distance, it is determined whether the reduction ratio of the actual fuel efficiency is still at least the threshold ratio. If a negative determination is made at the SE150, the control flow goes to SE160 corresponding to the function of the load-reduction control inhibiting portion 62, to withdraw the cancellation of the control inhibition map directed to the neutral inertia running control, which cancellation was made at the SE140. The SE160 is followed by the SE120. If an affirmative determination is made at the SE150, the SE150 is repeatedly implemented.

As described above, in the present embodiment, if the reduction ratio of the actual fuel efficiency is the threshold ratio or larger while the fuel-efficiency increase control is not executed, the fuel-efficiency increase control is executed whereby the reduction of the fuel efficiency can be made small.

While the preferred embodiments of this invention have been described in detail by reference to the drawings, it is to be understood that the invention may be otherwise embodied.

For example, in the above-described embodiments, as the acceleration representative value representing the acceleration required by the operator and associated with the location information Svp, the required drive force and the amount of change of the required drive force are used. However, both of the throttle opening degree tap and the throttle change amount Δtap do not have be necessarily contained in the control information Ic transferred from the vehicle 10 to the center 100, as long as at least one of the throttle opening degree tap and the throttle change amount Δtap is contained in the control information Ic. In this case, the control inhibition map is prepared based on the at least one of them, as the acceleration representative value, which is contained in the control information Ic.

In the above-described embodiments, the fuel-efficiency increase control can be executed in a plurality of various modes such as the idle stop control, deceleration economy running control, free-run control, neutral control and neutral inertia running control in the vehicle 10. However, the invention is applicable also to a vehicle in which the fuel-efficiency increase control can be executed in only one of the plurality of modes. In this case, in the control routine shown by the flow chart of FIG. 3, the control information Ic relating to the executable mode of the fuel-efficiency increase control is generated. In each of the control routines shown by the flow charts of FIGS. 4 and 6, the control inhibition map directed to the executable mode of the fuel-efficiency increase control is prepared. In the control routine shown by the flow chart of FIG. 5, the fuel-efficiency increase control is inhibited, based on the control inhibition map, from being executed in the executable mode. In the control routine shown by the flow chart of FIG. 7, the control inhibition map relating to the executable mode of the fuel-efficiency increase control is cancelled, and the cancellation is withdrawn.

Further, the control routine shown by the flow chart of FIG. 7 in the fourth embodiment may be modified. For example, the control inhibition maps directed to the respective modes may be cancelled in order of degree of contribution to the improvement in the actual fuel efficiency, such that one of the control inhibition maps directed to one of the modes that contributes to the fuel efficiency improvement the most is first cancelled, and such that one of the control inhibition maps directed to one of the modes that contributes to the fuel efficiency improvement the least is last cancelled. Further, the control inhibition maps may be cancelled in order of number of the executions such that one of the control inhibition maps directed to one of the modes that is executed the largest number of times is first cancelled and such that one of the control inhibition maps directed to one of the modes that is executed the smallest number of times is last cancelled. Further, in place of executing the control routine shown by the flow chart of FIG. 7 in which each control inhibition map can be cancelled and the cancellation can be withdrawn, each control information Ic transferred from the vehicle 10 to the center 100 may contain information indicative of the reduction ratio of the actual fuel efficiency in case of inhibition of each mode of the fuel-efficiency increase control, so that the control inhibition map is prepared based on the control information Ic containing the information indicative of the reduction ratio.

Further, in the above-described embodiments in which the fuel-efficiency increase control can be executed in various kinds of modes, the control inhibition maps directed to the respective modes of the fuel-efficiency increase control are prepared. However, the plurality of control inhibition maps may be replaced by a single control inhibition map directed to all the models of fuel-efficiency increase control and indicating in which area or areas each of the modes of the fuel-efficiency increase control is to be inhibited.

In the above-described embodiments, the center 100 stores therein the control inhibition map and updates the control inhibition map stored therein. However, the center 100 may be modified to have only functions of collecting the control informations Ic from the vehicle 10 and other vehicles 110. In this case, when being located in an area, the vehicle 10 receives, from the center 100, the control information Ic containing the location information Svp indicative of the same area, and then sets the control inhibition condition, based on the received control information Ic, which condition to be satisfied to inhibit the fuel-efficiency increase control in the same area. Thus, anything done by the vehicle 10 and anything done by the center 100 may be done by either the vehicle 10 or the center 100, except for a certain thing or things that have to be done by only one of them.

In the above-described embodiments, the connecting/disconnecting device configured to selectively connect and disconnect the engine 14 to and from the drive wheels 22 is constituted by the clutch C1 that constitutes a part of the automatic transmission 16. However, the clutch C1 may be provided independently of the automatic transmission 16. Where the automatic transmission 16 is constituted by a belt-type continuously variable transmission, the clutch C1 is provided independently of the continuously variable transmission. In this case, the connecting/disconnecting device may be constituted by a coupling device included in a known forward/reverse switching device that is provided as well as the belt-type continuously variable transmission in the vehicle.

It is to be understood that the embodiments and modifications described above are given for illustrative purpose only, and that the present invention may be embodied with various other changes and improvements which may occur to those skilled in the art.

NOMENCLATURE OF ELEMENTS

10: Vehicle
14: Engine
22: Drive wheels
50: Electronic control device (Control apparatus)
110: Other vehicle

What is claimed is:

1. A control apparatus for a vehicle provided with an engine and a plurality of drive wheels to which a drive force of the engine is to be transmitted, the control apparatus comprising:
a processor programmed to:
during an inertia running of the vehicle, execute a control configured to stop the engine or disconnect the engine from the plurality of drive wheels when the vehicle is (a) in a location of one specified road area of a plurality of road areas in which fuel efficient driving is performed to limit acceleration of each vehicle of a plurality of other vehicles, and (b) a value of a required acceleration of the plurality of other vehicles in each of the plurality of road areas is less than a predetermined acceleration value, which is set based on a level of the road or an intersection of the road, the location of each of the plurality of road areas and the required acceleration of the plurality of other vehicles at the plurality of road areas being acquired from the plurality of other vehicles; and
during the inertia running or the stop of the vehicle, prohibit execution of the control configured to stop the engine or disconnect the engine from the plurality of drive wheels in response to failing to satisfy the predetermined condition when the vehicle is located in the one of the plurality of road areas.

2. The control apparatus according to claim 1, wherein the processor is programmed to:
determine whether executing the control, depending on a difference between the acceleration representative value representing the required acceleration in the plurality of other vehicles when the control has been executed in the plurality of other vehicles and the acceleration representative value representing the required acceleration in the plurality of other vehicles when the control has not been executed in the plurality of other vehicles, and
not execute the control in one road area of the plurality of road areas indicated by the location information that is associated with the acceleration representative value, in a case where the difference is larger than a threshold value.

3. The control apparatus according to claim 2, wherein the processor is programmed to:
determine which one of a drive force performance and a fuel efficiency performance of the vehicle is given more importance by the operator of the vehicle, and
execute the control in the one area indicated by the location information that is associated with the acceleration representative value, irrespective of whether the drive force performance and the fuel efficiency performance is given more importance by the operator, in a case where the difference is not larger than the threshold value.

4. The control apparatus according to claim 2, wherein the threshold value varies depending on which area of the plurality of areas is indicated by the location information that is associated with the acceleration representative value.

5. The control apparatus according to claim 1, wherein, in a case where the acceleration representative value associated with the location information indicative of one area of the plurality of areas is larger than a threshold value, the processor of the control apparatus does not execute the control in the one area of the plurality of areas.

6. The control apparatus according to claim 5, wherein the processor is programmed to:
 determine which one of a drive force performance and a fuel efficiency performance of the vehicle is given more importance by the operator of the vehicle, and
 execute the control in the one area of the plurality of areas that is indicated by the location information that is associated with the acceleration representative value, irrespective of whether the drive force performance and the fuel efficiency performance is given more importance by the operator, in a case where the acceleration representative value is not larger than the threshold value.

7. The control apparatus according to claim 5, wherein the threshold value varies depending on which area of the plurality of areas is indicated by the location information that is associated with the acceleration representative value.

8. The control apparatus according to claim 1, wherein the processor is programmed to execute the control in a case where an actual fuel efficiency is reduced by at least a threshold ratio when the control has not been executed.

9. The control apparatus according to claim 1, wherein the processor is programmed to:
 generate the location information indicative of one area of the plurality of areas and the acceleration representative value representing the required acceleration of the vehicle required by the operator of the vehicle in the one area, the acceleration representative value being associated with the location information indicative of the one area, and
 transfer the generated information to an external device that is located outside the vehicle, via a transceiver provided in the vehicle.

* * * * *